Patented Apr. 6, 1937

2,076,080

UNITED STATES PATENT OFFICE 2,076,080

PROCESS FOR RECOVERING ZIRCONIUM OXIDE

Henri George, Paris, and Roger Lambert, Levallois-Perret, France, assignors to Societe Anonyme des Manufactures des Glaces & Produits Chimiques de Saint-Gobain, Chauny & Cirey, Paris, France No Drawing. Application November 27, 1934, Serial No. 754,994. In France December 23, 1932

4 Claims. (Cl. 23—19)

This invention relates to a process of recovering zirconia, i. e. zirconium oxide, from ores and minerals containing the same, such as zirconium silicate or zircon, and to products of such recovery. The present application is a continuation-in-part of our copending patent application Serial No. 702,964, filed December 18, 1933.

Zirconium principally occurs in nature in the form of its silicates, such as zircon, zirkite, etc. In the past, considerable difficulty has been experienced in finding a satisfactory process for recovering zirconium oxide in a sufficiently pure state to enable it to be exploited commercially.

In working up zirconium ores for the production of zirconia it has been found necessary, according to one process, to first treat the ore with hydrofluoric acid to extract some of the silica. The purified zirconium silicate is then calcined for about two hours at temperatures ranging between 1500° C. and 1600° C.

The calcined zirconium ore is then comminuted by placing it in water and the zirconia and silica, the combination between which has been broken up incidental to the calcination process, may then be separated due to the difference in their specific gravity.

This process is not altogether satisfactory because of the fact that the zirconium oxide or zirconia contains substantial amounts of silica as impurity, since the zirconium silicate will not be altogether decomposed into zirconia and silica even though the calcination may be extended for several hours.

According to another method used heretofore, minerals containing zirconium were heated with a mixture of a chlorid and, preferably, an oxide of an alkaline element.

The reaction mixture is pulverized and dissolved in sulphuric acid whereupon the silica is left as an insoluble residue while the zirconia goes into solution. The solution of zirconium may be separated from the insoluble silicic acid and the zirconium oxide may be precipitated from such solution.

This method is quite expensive and has to be continued for a very long time.

An object of the present invention is the provision of a simple and cheaper process of readily recovering pure zirconium oxide from zirconium silicate.

Another object is to provide a process of preparing zirconia from zirconium ores according to which zirconia and a silicate will be formed in such a condition, or such intermixture, that they may be directly utilized for abrasure, as an insulator, and/or as a refractory material.

A further object of the present invention is the provision of a process of recovering pure zirconium oxide in comparatively large quantities with the use of a comparatively small amount of hydrofluoric acid.

The present invention is based on the discovery that zirconium silicate, while being molten, decomposes itself into zirconium oxide and silica.

Naturally, for the purposes of this invention it is necessary that the entire amount of zirconium silicate used in the process be decomposed into zirconium oxide and silica.

In accordance with the present invention, substances which will react with silica without combining with zirconium oxide are added to the mixture of zirconium oxide and silica which has been produced by the decomposition of zirconium silicate caused by fusion.

According to an embodiment of the present invention, zirconium silicate is first fused to decompose it into crystalline zirconium oxide and silica. It is then allowed to cool and is then ground or comminuted. Then hydrofluoric acid is added to it. This acid will react with the silica to form volatile silicon fluoride ($SiF_4$). The zirconium oxide in the condition in which it is formed from the fusion will not react with hydrofluoric acid. The silicon fluoride can be easily and conveniently removed, leaving pure crystalline zirconium oxide. The result of this process is a rapid and complete elimination of the silica.

According to another embodiment of the present invention certain metal oxides capable of forming insoluble crystalline silicates are added before fusion to the zirconium ore or zirconium silicate. Among the oxides which may be added to the zirconium silicate before the fusion, are aluminum oxide, calcium oxide and/or magnesium oxide. Other oxides of the alkali earth or earth groups and second or third group of the periodical table may also be employed.

These alkali earth metal or earth metal oxides will react with the silica in the fused mixture of silica and zirconia resulting from decomposition of the zirconium ores or zirconium silicate, to form a silicate upon cooling, which silicate may be used for many purposes in intermixture with the zirconia.

For example, the resulting product consisting of a mixture of crystalline zirconia with a crystalline silicate may be used as an abrasive, an electrical insulator, or a refractory material, depending on the amount of zirconium oxide which it contains. It is entirely crystalline and its small crystals are very compact. The product is particularly adapted for use as a heat-proof or refractory material, for instance for glass-manufacturing ovens or pots, since it is not subject to deterioration when exposed to the action of molten glass.

By way of example, 82.5 parts by weight of bauxite containing 45% aluminum oxide and 40% silica, may be mixed with 17.5 parts by weight of zirconium silicate and the mixture is fused for example, in an electrical arc furnace. After the mixture has been allowed to cool rapidly, a refractory crystalline product is obtained which retains its structure up to a temperature of about 1720° C.

20 to 30 parts of zirconium silicate may be fused with 80 to 70 parts of alumina to form an abrasive material which is harder than corundum, or a crystalline refractory material which retains its structure up to a temperature ranging between 1850° C. and 1780° C.

70 parts by weight of zirconium silicate may be fused with 30 parts of aluminum oxide to form a crystalline product which can be used conveniently as an electrical insulator and which has many excellent mechanical properties.

Zirconium oxide may be added to the fused mixture of zirconium silicate and aluminum, magnesium and/or calcium oxide to increase the amount of zirconium oxide in the finished product. On the other hand, silica may be added to this mixture if it is desired to increase the amount of the silicates in relation to the amount of zirconium oxide, in the finished product.

According to a further embodiment of the present invention the mixture of zirconium oxide and silica obtained by fusion is cooled, comminuted and then passed through a sieve. Then sodium carbonate is added and the mixture is heated again to a temperature which should be lower than that of fusion but which should be sufficiently high to frit the mixture and to cause a formation of sodium silicate. This sodium silicate is dissolved and removed, and the solid residue containing all of the zirconium oxide and a certain amount of silica which has not reacted with the sodium, is treated by the addition of hydrofluoric acid to the residue.

In practice, this process may be carried out in the following manner:

A predetermined quantity of zircon is placed in an electrical furnace and is fused there by a three-phase electrical arc which usually required from 4 to 6 kilowatt-hours per kilogram of the molten product. On the average, the resulting molten substance contains 66% of zirconium oxide, 29% of silica and 5% of other substances.

The molten mixture is cooled and then ground or comminuted. The comminuted mixture is passed through a sieve.

Iron particles contained in the mixture after it has passed through the sieve, are removed by a magnet or by treating the mixture with diluted sulphuric acid.

Then sodium carbonate is added to the mixture in a proportion of 800 grams of sodium carbonate to each kilogram of the comminuted mixture, and the mixture of sodium carbonate, zirconium oxide and silica is fritted by heating it for about one hour at a temperature ranging between 600° C. and 700° C., whereby a large portion of sodium carbonate reacts with the silica to form sodium silicate.

The fritted mixture is washed in water to remove the sodium silicate.

Finally, hydrofluoric acid, preferably in the form of a 10% to 60% solution, is added to the residue. The silica contained in the residue reacts with the hydrofluoric acid and forms volatile silicon fluoride. The remaining zirconium oxide is washed in slightly sulphurized water to remove all traces of iron and is finally washed in pure water.

By this process a very pure crystalline zirconium oxide is obtained. Only a small amount of hydroflouric acid is used up in the course of this process, since this acid merely completes the action of sodium carbonate. Experience has shown that sodium carbonate alone can never remove the entire amount of the silica.

What is claimed is:

1. The process of recovering zirconia from zirconium ores, which comprises fusing zirconium silicate until the entire zirconium silicate is decomposed into silica and crystalline zirconia, and then removing the silica by treating the mixture in a cold state with hydrofluoric acid which reacts wth the silica without attacking crystalline zirconia, whereby pure crystalline zirconia is recovered.

2. The process of recovering zirconia from zirconium ores, which comprises fusing zirconium silicate until the entire zirconium silicate is decomposed into silica and crystalline zirconia, treating the mixture with sodium carbonate at a temperature ranging between 600° C. and 700° C., which at that temperature reacts with a portion of said silica without attacking zirconia, whereby a portion of said silica is removed and then treating the residue with hydrofluoric acid to remove the rest of the silica, said hydrofluoric acid reacting with the remaining silica without attacking crystalline zirconia, whereby pure crystalline zirconia is recovered.

3. The process of recovering zirconia from zirconium ores, which comprises fusing zirconium silicate until the entire zirconium silicate is decomposed into silica and crystalline zirconia, cooling the mixture of silica and crystalline zirconia, comminuting said mixture, heating said mixture with sodium carbonate to a temperature ranging between 600° C. and 700° C. which at that temperature reacts with a portion of said silica to form sodium silicate without attacking zirconia, removing said sodium silicate, and then treating the residue with hydrofluoric acid to remove the rest of the silica, said hydrofluoric acid reacting with the remaining silica without attacking crystalline zirconia, whereby pure crystalline zirconia is recovered.

4. The process of recovering zirconia from zirconium ores, which comprises fusing zirconium silicate until the entire zirconium silicate is decomposed into silica and crystalline zirconia, cooling the mixture of silica and crystalline zirconia, comminuting said mixture and passing it through a sieve, removing iron particles from said mixture, adding sodium carbonate to said mixture, fritting the mixture by heating the same to a temperature ranging between 600° C. and 700° C., said sodium carbonate at that temperature reacting with a portion of said silica to form sodium silicate without attacking zirconia, washing the fritted mixture to remove sodium silicate, treating the residue with hydrofluoric acid to remove the rest of the silica, said hydrofluoric acid reacting with the remaining silica without attacking crystalline zirconia, and removing traces of iron from said zirconia, whereby pure crystalline zirconia is recovered.

HENRI GEORGE.
ROGER LAMBERT.